United States Patent [19]

Ballantyne

[11] Patent Number: 4,841,898
[45] Date of Patent: * Jun. 27, 1989

[54] ANCHORING SYSTEM FOR FLOATING STRUCTURE

[75] Inventor: Ronald Ballantyne, Burlington, Canada

[73] Assignee: John T. Hepburn, Limited, Mississaugua, Canada

[ * ] Notice: The portion of the term of this patent subsequent to Apr. 27, 2005 has been disclaimed.

[21] Appl. No.: 860,838

[22] Filed: May 8, 1986

[30] Foreign Application Priority Data

May 10, 1985 [CA] Canada ............................ 481239

[51] Int. Cl.$^4$ ............................................. B63B 21/50
[52] U.S. Cl. ................................... 114/293; 114/230; 254/372
[58] Field of Search ............... 114/230, 293, 200, 181; 254/372

[56] References Cited

U.S. PATENT DOCUMENTS

| 36,087 | 8/1862 | Harfield | 254/372 |
|---|---|---|---|
| 3,967,572 | 7/1976 | Lea | 114/293 |
| 3,985,093 | 10/1976 | Eidem | 114/293 |
| 4,020,779 | 5/1977 | Kitt | 114/230 |
| 4,023,775 | 5/1977 | Beattie | 254/372 |
| 4,078,768 | 3/1978 | Krogstad et al. | 114/230 |
| 4,497,471 | 2/1985 | Longberg et al. | 254/372 |

Primary Examiner—Sherman D. Basinger
Assistant Examiner—Thomas J. Brahan
Attorney, Agent, or Firm—Sim & McBurney

[57] ABSTRACT

An anchoring system for a floating structure is described. The anchoring system is of the type which employs a combination anchor line consisting of a lower length of chain cable connected to an anchor and an upper length of wire rope and which involves disconnection of the wire rope from the chain cable during paying out and retrieval of the anchor line. A winch and windlass mounted on the floating structure serve to separately haul in and pay out the wire rope and chain cable, respectively. The windlass has a length of lead chain which can be used to lead the chain cable over a chain wheel to the chain locker. An overwide chain link terminates the chain cable, and together with a pair of detachable links permits the load of the chain cable to be transferred directly from the winch to the windlass, during paying out and retrieval, without the requirement for an intermediate chain hanger. The fairlead sheave and the chain wheel associated with the windlass are designed to convey the overwide chain link as if it were any other link in the chain line, and consequently no swivels or other special measures are required to ensure that the overwide chain link is properly conveyed over these devices.

4 Claims, 4 Drawing Sheets

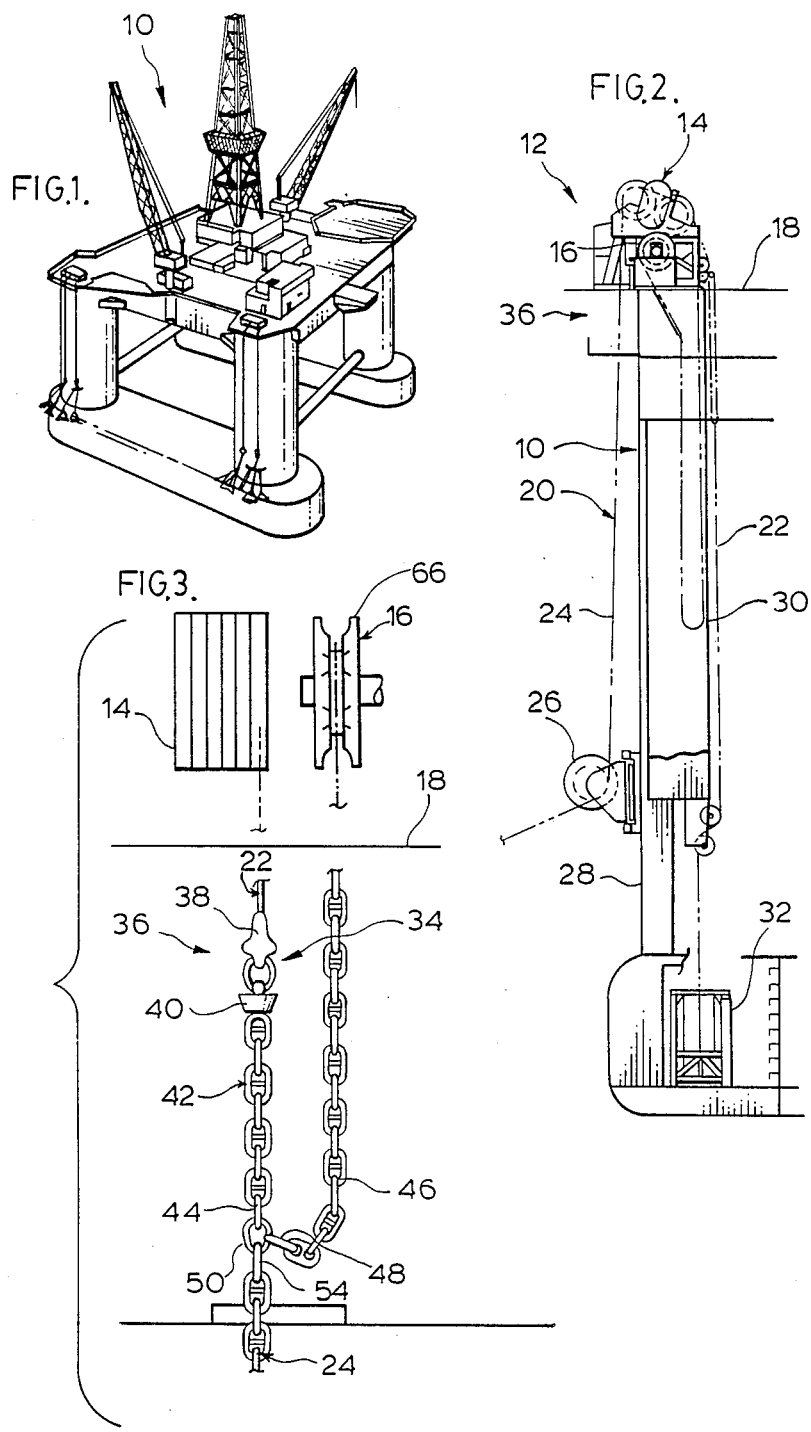

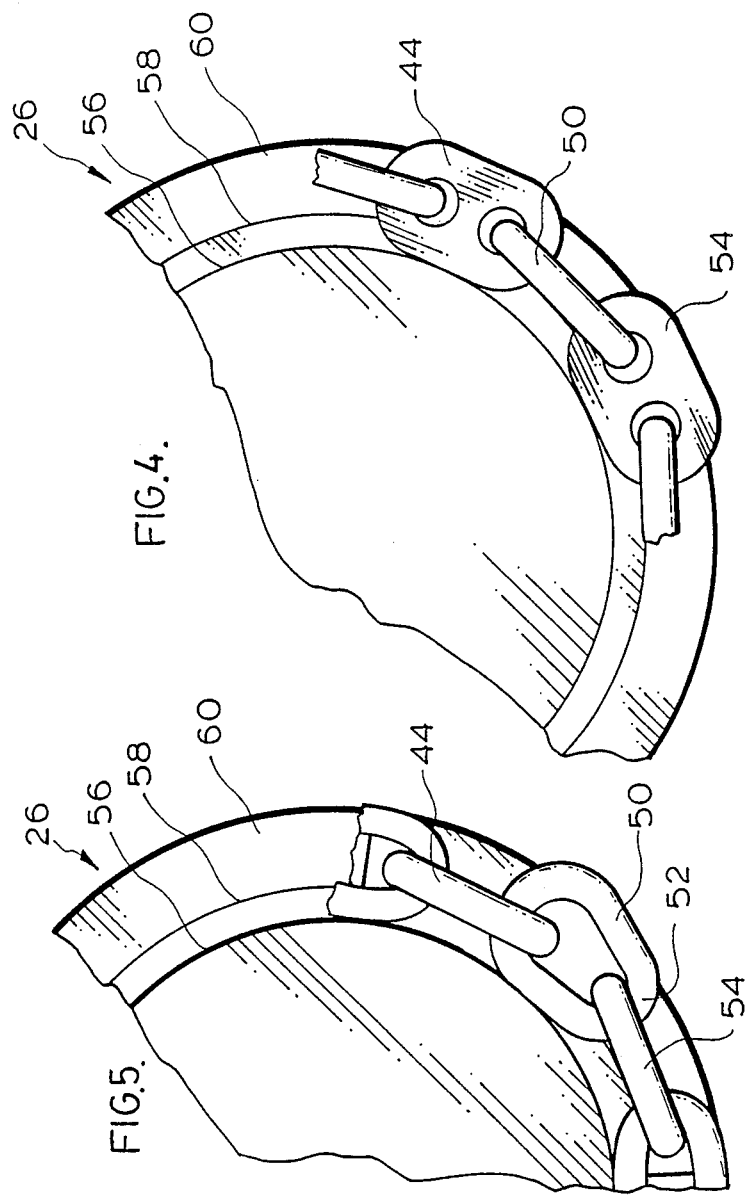

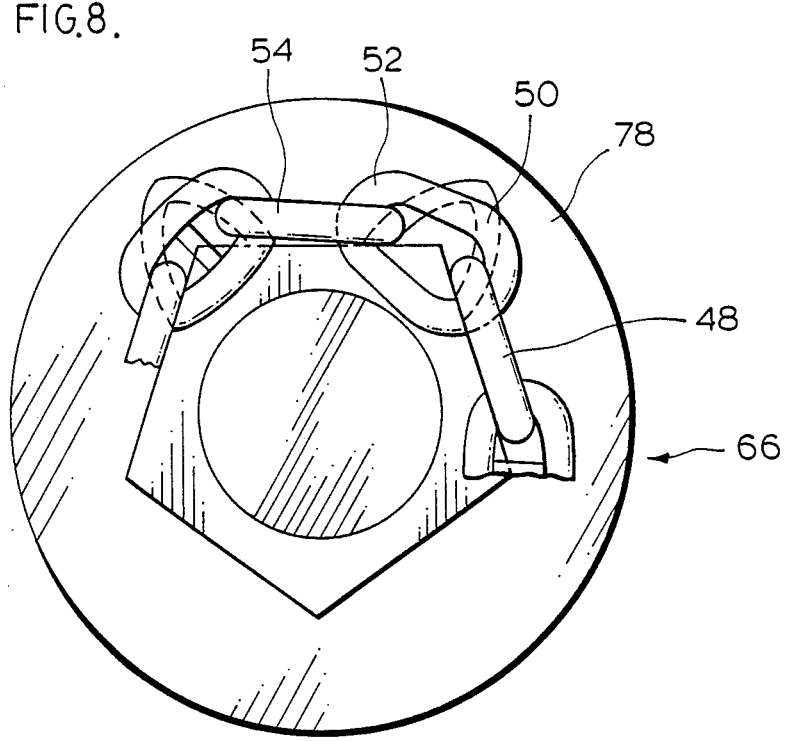

ANCHORING SYSTEM FOR FLOATING STRUCTURE

FIELD OF THE INVENTION

The invention relates generally to anchoring systems, and more specifically, to anchoring systems of the "disconnect" type involving an anchoring line consisting of wire rope and chain cable, such as are commonly used in mooring offshore drilling platforms and other ocean-going vessels.

BACKGROUND OF THE INVENTION

The advantages of employing a combination anchoring line consisting of the lower length of chain cable serially connected to an upper lenth of wire rope are well recognized. In particular, better anchoring characteristics at certain water depths can be achieved than possible through use of wire rope or chain alone, and an overall capability of mooring in deeper waters obtained. In handling such an anchor line directly from a floating structure, a winch and a windlass are required to handle the components of the anchoring system, and in "disconnect" systems in which the junction between the wire rope and chain cable is broken, to permit the appropriate component of the anchor line to be handled by the appropriate one of the winch and windlass, provision must be made for transferring chain load between the winch and windlass.

In U.S. Pat. No. 3,842,776 which issued to Wudtke on Oct. 22, 1974, there is described a particulate disconnect system in which a chain hanger consisting of a length of wire rope fastened to the anchored structure and teminated with a hook is taught as means for supporting chain load when the connection between wire rope and chain cable is to be broken, during paying out or retrieval of the anchor line. For example, during paying out, the chain is delivered from a chain locker aboard the anchored structure by means of a chain wheel having a lead chain to which the chain cable is connected. Once the anchor line is payed out to the extent possible by the windlass, the chain hanger is attached to the chain to support its weight, the windlass lead chain, disconnected from the chain cable by means of a disconnectable link, and the chain cable, then connected to a lead chain attached to the wire rope line. The chain hanger is then disengaged, and the anchor line payed out under the control of the winch. Such disconnect systems are satisfactory, and are still used today, but suffer the serious disadvantage that chain hangers are cumbersome and endanger the safety of the workmen who must operate them, particularly in rough waters.

An alternative disconnect system which proposed the elimination of a chain hanger is disclosed in U.S. Pat. No. 4,020,779 which issued on May 3, 1977 to Kitt. The Kitt patent describes an anchoring system substantially identical to that of the Wudtke patent, except that a special chain link with three loops (commonly referred to as a "tri-link") is introduced into the chain line. Two loops are used at any time to couple the chain cable to the winch or windlass. Both the wire line and windlass have an associated length of lead chain terminated with a disconnectable link by means of which the particular lead chain, if not already under load, can be coupled to the extra loop of the tri-link. Thus, both lead chains could be simultaneously engaged in the tri-link because of the special additional loop, and loads transferred directly between winch and windlass without intermediate transfer of anchor chain load to a chain hanger.

As a load transfer device, the tri-link closely resembles a "tri-plate" commonly used in earlier Union Purchase rigs, and in early semisubmersible drill rigs in which a combination anchor line was not run directly over a fairlead sheave. Such load transfer devices were never designed to run over sheaves and wildcats. The tri-link, somewhat resembling a more conventional chain link, can accordingly pass smoothly over a sheave or chain wheel depending in large measure on how the tri-link is oriented during its approach to sheave or chain wheel. As taught in the Kitt patent, a swivel is required at least in the lead chain associated with the wire lead, and the chain links extending from the chain locker must be aligned in a specific manner, to ensure that the extra loop of the tri-link passes over the associated fairlead sheave and chain wheel with the extra loop pointing radially out. A significant problem with such an arrangement is that a swivel cannot be properly conveyed over a sheave. A swivel may be expected to be severely stressed, and there is a serious risk of failure of the chain line. Also it cannot be guaranteed that the chain cable will be conveyed over the chain wheel consistently in a predetermined orientation, as chain links are known to advance a half or full pitch during passage over a chain wheel, particularly during deployment, causing all succeeding links to be conveyed rotated at 90 or 180 degrees to the attitude otherwise expected. Additionally, the trilink is unsuitable for systems incorporating a pocketted fairleader intended to permit the associated vessel to moor for extended periods of time on chain alone, which is particularly desirable at certain water depths.

It is an object of the present invention to provide a combination anchor system of the disconnect type incorporating into the chain line a load transfer device which eliminates need for a chain hanger and which in various embodiments can be conveniently and reliably conveyed over a smooth fairlead sheave, a pocketted fairlead sheave or a chain wheel.

BRIEF SUMMARY OF THE INVENTION

The invention provides an anchoring system for a floating structure, which includes an anchor, and an anchor line having a chain cable which is connected to the anchor, a wire rope, and a connector joining the wire rope to a first length of lead chain. A winch and windlass are mounted on the foating structure to haul in and pay out the wire rope and chain cable, respectively. A chain locker is provided in the floating structure for storage of the chain cable, and a second length of lead chain is associated with the windlass to lead the chain cable over the windlass chain wheel to the chain locker.

An overwide chain link terminates the chain cable, and serves as a load transfer device which permits transfer of chain load directly between winch and windlass, without an intermediate chain hanger, during anchor line retrieval and paying out. The term "overwide chain link" as used in this specification means a chain link having substantially the same length as the other more conventional chain links in the asociated chain cable, but having a greater width, specifically a wider overall space in the interior of the link. This space must be adequate to simulatenously receive a pair of detachable links, and shaped to avoid jamming of the detachable links within the overwide chain link when the chain load is transferred from one detachable link to the other, thereby permitting the non-load bearing detachable link to be removed.

A first detachable link is provided to connect the first length of lead chain, associated with the wire rope, to the overwide link, and a second detachable link, to connect the second length of lead chain, associated with the windlass, to the overwide link. Accordingly, during the paying out or retrieval of the anchor line, when disconnection of the wire rope from the chain cable is required, the chain load can be transferred directly between the winch and windlass by engaging the then free lead chain to the overwide chain link, backing off the one of the winch and windlass which is then supporting the chain load, thereby transferring chain load to the other device, and thereafter disconnecting the particular one of the winch or windlass from the chain cable.

The fairlead sheave required to guide the anchor line to and from the floating structure is provided with a wire rope groove and a chain groove formed about the wire rope groove. The rope and chain grooves are dimensioned to convey the chain links of the chain cable, including the oversized link, with alternate links extending into the wire rope groove, the other links being supported against the chain groove. The "chain groove" may consist of circumferentially spaced pockets, if a fairlead sheave resembling a chain wheel is to be used. This latter type fairlead sheave is particularly advantageous if the vessel is to be moored on the chain only.

The chain wheel associated with the chain wheel is formed with a circumferential groove and paired whelps, one whelp of each pair positioned on either side of the circumferential groove, and spaced to define pockets in the chain wheel. The circumferential groove is provided with a depth sufficient to receive the overwide chain link when chain links attach to either side of the overwide chain link seat in the pockets of the chain wheel. Also, the whelps are tapered sufficiently to permit the overwide link to ride within the pockets defined by the whelps, when the chain links attached to either side of the overwide chain link extend into the circumferential groove. Sufficient tapering permits the overwide link to ride slightly higher in the pockets if required.

Accordingly, the overwide chain link fuctions as the required load-transferring device, and passes over the required fairlead sheave and chain wheel in substantially the same manner as other chain links. This arrangement avoids the need for special devices such as swivels in the chain line, and there is little likelihood of masalignment of the load transfer device during transition over fairlead sheaves and chain wheels.

The term "chain wheel" as used in this specification is intended to iclude both a "wildcat" as commonly used in North America, and a "gypsy" as commonly used in Europe. The term "whelp" as used in this specification is intended to include the points of the scallops characteristic of a European gypsy.

Other advantages associated with the invention will be more apparent from a description of the preferred embodiment below and suggested modifications thereto.

DESCRIPTION OF THE DRAWINGS

The invention will be better understood with reference to drawings illustrating a preferred embodiment, in which:

FIG. 1 is a perspective view illustrating a semisubmersible drill platform;

FIG. 2 is a fragmented side elevational view at a corner of the drill platform illustrating components of an anchoring system embodying the invention;

FIG. 3 is a diagrammatic view showing a winch, a windlass associated with the anchoring system, and a work station at which load transfer between the winch and windlass is effected directly by means of a pear-shaped link;

FIG. 4 is a fragmented elevational view showing the pear-shaped link being conveyed over the fairlead sheave in a first possible orientation;

FIG. 5 is a fragmented elevational view showing the pear-shaped link being conveyed over the fairlead sheave in a second possible orientation;

DESCRIPTION OF PREFERRED EMBODIMENT

Figure 6:
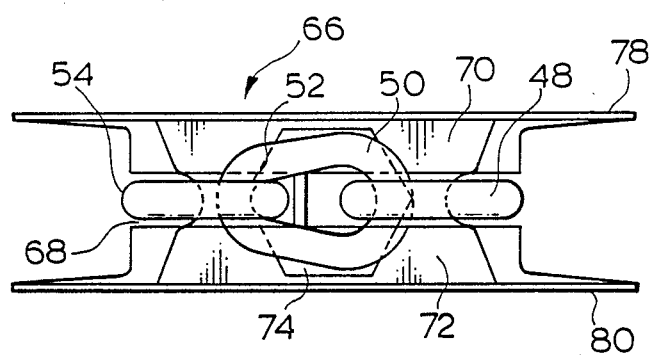
FIG. 6 is an elevational view and FIG. 7 a fragmented elevational view, in cross-section, of the pear-shaped link being conveyed over a chain wheel in a first possible orientation; and, FIG. 8 is a fragmented elevational view showing the pear-shaped link being conveyed over the chain wheel in a second possible orientation.

Reference is made to FIG. 1 which illustrates a semisubmersible drill rig 10 which has two anchoring systems embodying the present invention at each corner. One such anchoring system generally indicated by the reference numeral 12 is more specifically detailed in the view of FIG. 2. The anchoring system 12 includes a traction winch 14 and a windlass 16 mounted adjacent one another on the deck 18 of the drill rig 10. These serve to haul in and pay out a combination anchor line 20 which includes an upper length of wire rope 22 serially connected to a lower length of chain cable 24, the chain cable 24 being terminated with an appropriate anchor. The anchor line 20 is hauled in and payed out over a fairlead sheave 26 fixed to a leg 28 of the drill rig 10. A chain locker 30 is provided in the leg 28 for storage of the chain cable 24, and a conventional storage winch 32 is positioned at the foot of the leg 28 to collect wire rope hauled in by the traction winch 14.

The anchoring system 12 is of the dissconnect type. Basically, as illustrated in FIG. 3, the wire rope 22 is hauled in by the traction winch 14 until the wire rope-chain cable junction 34 is accessible at a work station 36 below the deck 18 of the vessel. As illustrated, the junction 34 includes a standard socketed rope connector 38, and special collar 40 secured about a penultimate link of the anchor chain. The collar 40 co-operates with the connector 38, in a manner not essential to the understanding and implementation of the present invention, to guide the junction 34 smoothly over the fairlead sheave 26. The connector 38 joins the wire rope 22 more immediately to a length of lead chain 42 which is terminated at an opposing end with a detachable link 44. The windlass 16 has associated therewith a lead chain 46 which has one end fixed to the interior of the chain locker 30 and the other end terminated with a detachable link 48. The lead chain 46 is used to guide the chain cable into the chain locker 30.

The chain cable 24 is terminated with a pear-shaped link 50. This is an overwide link which, adjacent its wider end, is broader than the standard chain links in the chain cable 24. The narrow end portion 52 is interlinked with the penultimate link 54 of the chain 24, which is a detachable link. The interior space of the pear-shaped link 50 is sufficient to permit both detachable links 44, 48 to be received simulataneously, as illustrated in FIG. 3.

In FIG. 3, the load of the chain cable 24 is being transferred from the winch 14 to the windlass 16, in preparation for hauling of the chain cable 24 into the chain locker 30. The detachable link 48 associated with the windlass lead chain 46 has been inserted into the pear-shaped link 50. The traction winch 14 can then be operated to pay out rope until chain load has been transferred to the windlass 16. At that point, the detachable link 44 associated with the rope lead chain 42 can be disconnected to permit the chain cable 24 to be hauled into the chain locker over the windlass 16. Paying out involves an analogous procedure.

The structure of the fairlead sheave 26 is detailed in the views of figs. 4 and 5. The fairlead sheave 26 has a circumferential wire rope groove 56, surrounded by a relatively broad chain groove 58. A pair of opposing circumferential flanges (only one flange 60 apparent), one extending radially outwardly from either side of the chain groove 58, ensures that the anchor line 20 remains confined to the grooves 56, 58.

The rope and chain grooves 56, 58 are dimensioned to convey the chain links of the chain cable 24, including the pear-shaped link 50, with alternate links extending into the wire rope groove and the other link supported against the chain groove. The pear-shaped link 50 is conveyed over the fairlead sheave 26 in the two possible orientations common to all the chain links of the chain cable 24. As illustrated in FIG. 4, the pear-shaped chain link is oriented substantially "flat" against the chain groove 58, transverse to the general plane of the fairlead sheave 26. The separation of the sheave flanges, or more specifically the axial width of the chain groove 58, is sufficient to accommodate the extra width of the pear-shaped link 50. In FIG. 5, the pear-shaped link 50 is shown conveyed over the fairlead sheave 26 in the other possible orientation (parallel to the general plane of the fairlead sheave 26). In the latter orientation, the pear-shaped link extends into the wire rope groove 56. The pear-shaped link simply extending radially further out than the other links, and the adjacent link 54 is free to move along the internal curvature of the pear-shaped link 50 to rest against the chain groove 58. Acordingly, the pear-shaped link 50 can traverse the fairlead sheave 26 in substantially the same manner as any other chain link, without swivels or other measures to ensure proper orientation.

Figure 7:
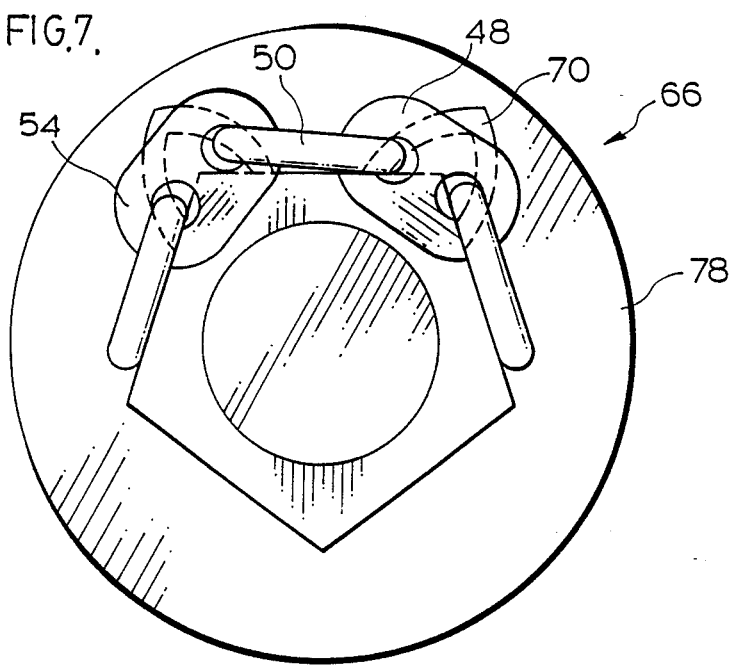

The windlass 16 has a chain wheel 66 whose construction is illustrated in FIG. 6 and 7. The chain wheel has a circumferential groove 68, and paired whelps (only one pair consisting of whelps 70, 72 being specifically indicated in fig. 6), one whelp of each pair being located on either side of the circumferential groove 68. The whelp pairs are circumferentially spaced apart in a manner well known in the art to define pockets (such as the pocket 74 indicated in FIG. 6) which serve to contain the individual chain links associated with the chain cable 24. The circumferential groove 68 has a depth (radial dimension) sufficient to receive not only the standard chain links of the chain cable 24 (when oriented in the general plane of the chain wheel 66), but also the wider pear-shaped link 50, when adjacent links 48, 64 seat in the pockets of the whelps is illustrated in FIG. 8. The whelps taper sufficiently to thinner cross-sections at increasing radii from the hub of the chain wheel to permit the pear-shaped link 50 to ride within the pockets, when the adjacent chain links 48, 64 extend into the circumferential groove 68, as illustrated in FIG. 7. The opposing flanges 78, 80 of the chain wheel 66 must of course be sufficiently spaced-apart axially to permit the required tapering of the whelps and receipt of the pear-shaped link 50 in the chain wheel pockets.

The two orientations of the pear-shaped link 50 relative to the chain wheel 66 illustrated in FIGS. 7 and 8 represent the only two orientations in which the pear-shaped link can engage the chain wheel 66 in normal operation. Accordingly, the pear-shaped link 50 traverse the chain wheel 66 in substantially the same manner as any other chain link in the chain cable 24. No special pre-orientation of the windlass lead chain 46 is required.

Additionally, the pear-shaped link 50 is symmetric about it longitudinal axis. This is particularly significant in the load transfer process. A shortcoming associated with the tri-link is that its "left" or "right" orientation when received at a workstation significantly affects the ease with which a lead chain can be engaged with the extra loop. In particular, the tri-link may have to be rotated through 180 degrees, before the extra loop extends in the direction from which the lead chain is adapted to pull. The symmetry of the pear-shaped link obviates this problem, as would similar symmetry of other oversized links about their longitudinal axes.

If desired, a central crossbar can be attached in the interior of the pear-shaped link for purposes of reinforcement or adjacent the narrow end portion 52 to ensure that the pear-shaped link does not become disoriented and inverted within the chain line. A more standard chain link (resembling the links generally located in the chain cable 24) can be substituted for the pear-shaped link 50. Such a link would of course have to be an "overwide" chain link, sufficiently wider than the more conventional links to ensure receipt of the detachable links required for load transfer between the winch and windlass 14, 16. The crossbar of such a link might be moved closer to one end of the link to facilitate insertion of the required detachable links during load transfer. A circular link might also be substituted; however, this would require an increase in the width of the associated fairlead sheave and chain wheel, which is less desirable.

A pocketted fairlead sheave may be substituted for the smooth fairlead sheave 26 to adapt the anchoring system for extended mooring on the chain cable 24 alone. The pocketted fairleader would have substantially the same construction as the chain wheel 66, and consequently will not be described.

It will be appreciated that a particular embodiment of the invention has been described and that modifications may be made therein without departing from the spirit of the invention or the scope of the appended claims.

I claim:

1. An anchoring system for a floating structure, comprising:
   an anchor;
   an anchor line including a chain cable connected to the anchor, a wire rope, and a connector joining the wire rope to a first length of lead chain;
   a winch mounted on the floating structure for hauling in and paying out the wire rope;
   a chain locker formed in the floating structure for storage of chain cable;
   a windlass mounted on the structure for hauling in and paying out the chain cable, including a chain wheel and a second length of lead chain for leading the chain cable over the chain wheel to the chain locker;

an overwide chain link terminating the chain cable;

a first detachable link for connecting the first length of lead chain to the overwide chain link;

a second detachable link for connecting the second length of lead chain to the overwide chain link;

a fairlead sheave mounted on the floating structure for guiding the anchor line to and from the floating structure, the fairlead sheave having a wiring rope groove, and a chain groove formed about the wire rope groove, the chain groove being dimensioned to convey the chain links to the chain cable including the overwide link;

the chain wheel having a circumferential groove and paired whelps, one whelp of each pair on either side of the circumferential groove, defining pockets in the chain wheel, the circumferential groove having a depth sufficient to receive the overwide chain link when chain links attached to either side of the overwide chain link seat in the pockets of the chain wheel, the whelps being tapered sufficiently to permit the overwide link to ride within the pockets defined by the whelps when the chain links attached to either side of the overwide chain link extend into the circumferential groove.

2. An anchoring system as claimed in claim 1 in which the overwide link is symmetric about its longitudinal axis.

3. An anchoring system as claimed in claim 2 in which the overwide link is generally pear-shaped.

4. An anchoring system as claimed in claim 1 in which the fairlead sheave comprises a circumferential groove which serves as the rope groove and paired whelps, one whelp of each pair on either side of the circumferential groove defining pockets in the fairlead sheave, the circumferential groove hauling a depth sufficient to receive the overwide chain link when chain links attached to either side of the overwide chain link seat in the pockets of the fairlead sheave, the whelps being tapered sufficiently to permit the overwide link to ride within the pockets defined by the whelps when the chain links attached to either side of the overwide chain link extend into the circumferential groove.

* * * * *